United States Patent [19]

Leyat

[11] Patent Number: 5,470,470
[45] Date of Patent: Nov. 28, 1995

[54] LIQUID FILTER FIBER MODULE DISPOSED IN AN INFLATABLE BELT

[75] Inventor: Jean-Claude Leyat, Sion, Switzerland

[73] Assignee: Leyat Fils Marketing SA, Sion, Switzerland

[21] Appl. No.: 122,538

[22] PCT Filed: Feb. 10, 1993

[86] PCT No.: PCT/CH93/00034

§ 371 Date: Sep. 30, 1993

§ 102(e) Date: Sep. 30, 1993

[87] PCT Pub. No.: WO93/15821

PCT Pub. Date: Aug. 19, 1993

[30] Foreign Application Priority Data

Feb. 10, 1992 [CH] Switzerland ................ 3532/91

[51] Int. Cl.[6] .................................................. B01D 39/06
[52] U.S. Cl. ............................................ 210/350; 210/411
[58] Field of Search ................... 55/475, 477; 210/348, 210/350, 351, 411

[56] References Cited

U.S. PATENT DOCUMENTS 3,180,825 4/1965 Couvreur et al. .
4,139,473 2/1979 Alldredge .
4,219,420 8/1980 Muller .
4,816,147 3/1989 Eyben et al. .
4,851,136 7/1989 Fanging et al. .

Primary Examiner—Robert A. Dawson
Assistant Examiner—W. L. Walker
Attorney, Agent, or Firm—Young & Thompson

[57] ABSTRACT

A liquid filtration apparatus comprises a filter body (1) housing a filter module (3) and having an inlet port (6) for the liquid to be filtered and an outlet port (10) for the filtered liquid. The filter module (3) consists of a compact mass of substantially parallel elongate fibers (28) oriented axially in a cylindrical casing. An inflatable band surrounds the fiber mass and is located between the fiber mass and the inner wall of the cylindrical casing.

5 Claims, 2 Drawing Sheets

LIQUID FILTER FIBER MODULE DISPOSED IN AN INFLATABLE BELT

FIELD OF THE INVENTION

The present invention is concerned with a filtering apparatus for a liquid, which is more particularly designed for clarifying drinking water, as well as for recycling household or industrial waste waters, or for other applications, such as for example in the general field of chemistry, food processing, etc.

BACKGROUND OF THE INVENTION

In numerous industrial fields, it is necessary to have at one's disposal filtering installations for liquids, in particular for water, which are both efficient and convenient to use. Preferably, such installations should include a filtering system which can readily be cleaned, for example by countercurrent rinsing, without the need to dismount the installation and if possible, automatically.

SUMMARY OF THE INVENTION

Accordingly, the objective of the present invention is to provide such installations, which include a filtering system of a type which is both new and original. The object of this invention aimed at satisfying this objective thus consists of a filtering apparatus for a liquid which comprises a filter body housing a filter module and having an inlet port for the liquid to be filtered and outlet port for the filtered liquid.

Another object of this invention is a filtering module which consists of a compact mass of substantially parallel elongate fibers oriented axially in a cylindrical casing. An inflatable band surrounds the fiber mass and is located between the fiber mass and the inner wall of the cylindrical casing.

BRIEF DESCRIPTION OF THE DRAWINGS

The appended drawing illustrates schematically and by way of example the two objects of the invention.

DETAILED DESCRIPTION OF THE INVENTION

Figure 1:
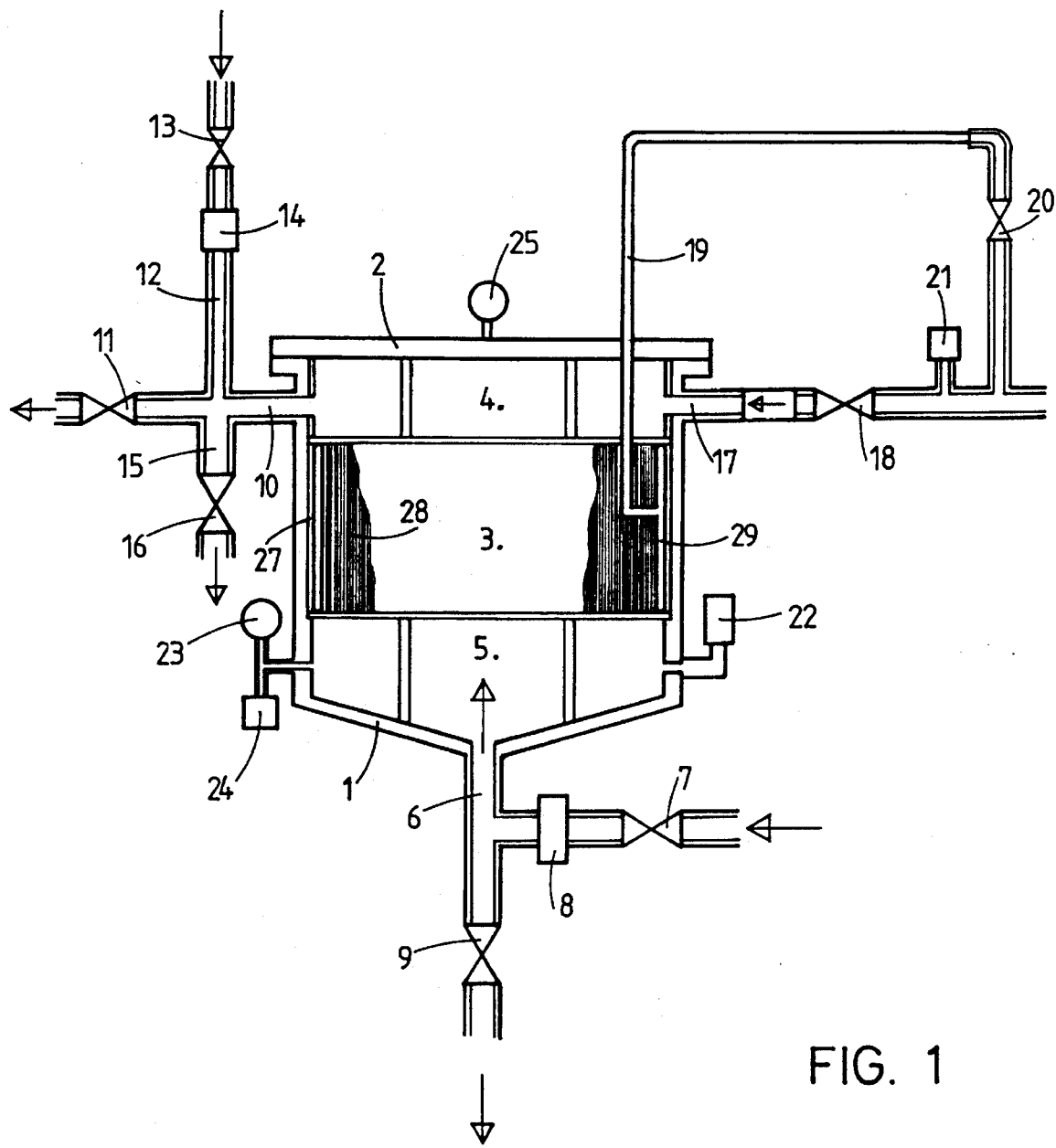
FIG. 1 is a basic diagram illustrating the manner in which the filtering apparatus of the invention is constructed.

With reference firstly to FIG. 1, the apparatus illustrated includes a filter body 1 of a cylindrical shape, the upper part of which is closed by a cover 2, and in which is housed a filtering module 3 which will be described more in detail later. This filtering module 3 occupies a central position in the internal volume defined by the filter body 1, in such a manner that two cavities, respectively the upper one 4 and the lower one 5 are formed respectively above and below said module.

The introduction of the liquid to be treated is carried out via an orifice 6 located at the lower end of the conical bottom of body 1, the tube for the introduction being provided with a valve 7 and with a flow regulator 8; the introduction orifice 6 is also intended for draining purposes and is hence connected to an evacuation tube provided with a valve 9. Two orifices are provided in the upper cavity 4, of which the first orifice 10 is used as outlet for the filtered liquid and is connected on the one hand to an outlet tube equipped with a valve 11 and on the other hand to a tube 12 for introducing the rinsing liquid via a valve 13 and a flow regulator 14, and further to a drainage tube 15 provided with a valve 16. The second orifice 17 is designed for introducing compressed air via a check valve 18 into the upper cavity 4; further, the compressed air circuit also includes a supply conduit 19 opening into the filtering module 3, of which the functioning will be described in detail later. An inlet valve 20 is further provided on this conduit 19, as well as a pressure controller 21.

The apparatus according to the invention, as illustrated schematically in FIG. 1, can further include other ancillary equipment, such as a puppet va.ve 22, a pressure controller for the rinsing liquid 23, a maximum pressure controller 24, and a downstream pressure control gauge 25.

Figure 2:
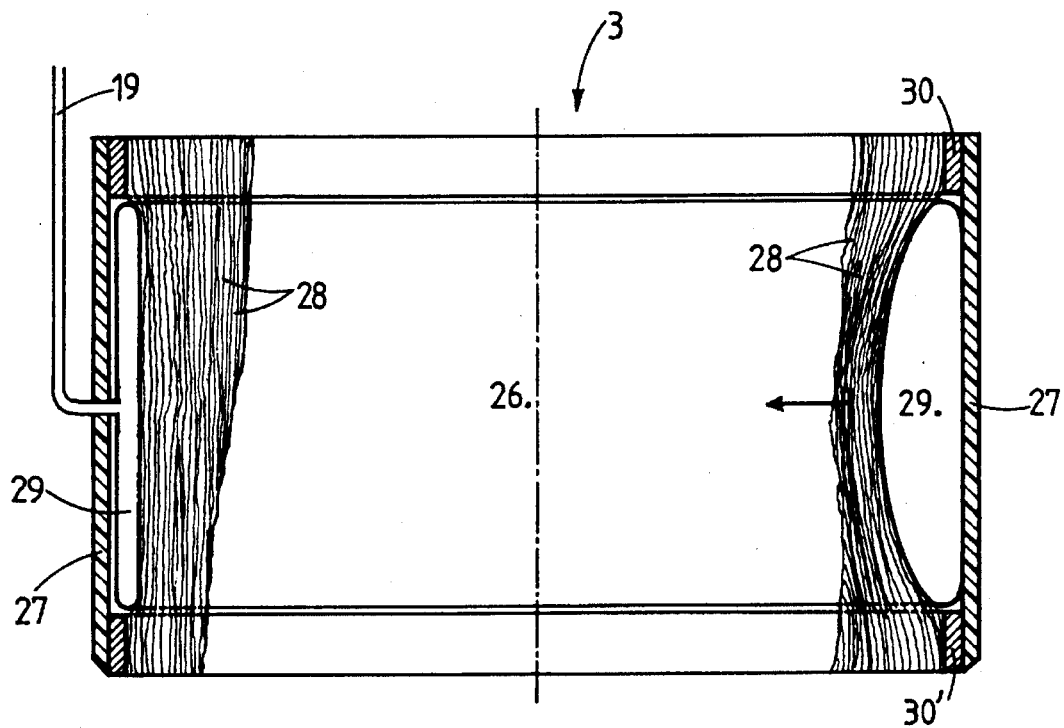
FIGS. 2 and 3 are respectively a side view partly in vertical cross-section and a view from beneath partly in horizontal cross-section of an embodiment of the filtering module according to the invention.
Figure 3:
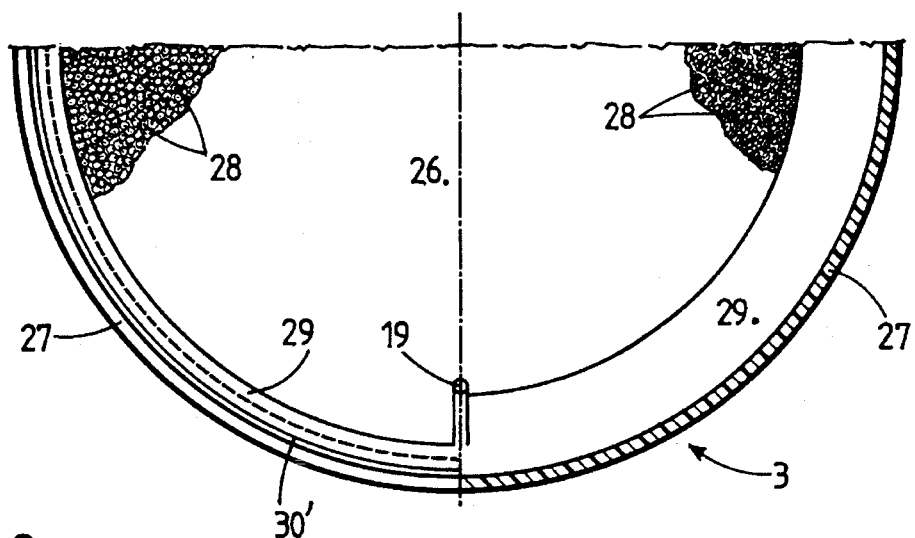

Concerning the filtering module itself, as illustrated by way of example in FIGS. 2 and 3, it is formed by a filtering mass 26 housed inside a cylindrical casing 27 made of a synthetic material, for example of PVC or possibly metal.

This filtering mass 26 is formed here by continuous textile fibers 28, for example of polyester, each having a diameter in the order of about 15 microns; these fibers can be slightly "crimped" and are arranged axially so as to run substantially parallel to one another in the cylindrical casing 27.

In alternative embodiments (not illustrated), the fibers forming the filtering mass can have a diameter comprised between approximately 3 and 40 microns; their cross-section is not necessarily circular, but can be, for example, C-shaped or Y-shaped. The filtering mass can also be made of fibers which differ from one another in their characteristics (size and cross-sectional shape) or of non-continuous fibers assembled axially by carding.

As a practical example, one can use capillary tubes of the type sold commercially under the trade name "SORBAROD" (Baumgartner Papiers S. A., Switzerland), the outer envelope—which is made of polyethylene for example—being removed to obtain said filtering mass 26 by assembling a plurality of such tubes.

The through flow of the liquid which is to be filtered and the retention of suspended matter contained therein are determined by the nature of the constituent fibers and by the density of packing or filling of said fibers. The choice of this density will be made in particular according to the liquid to be treated and the impurities to be retained. In the case of the above-mentioned "SORBAROD" packing, this density amounts to approximately 30,000 fibers/cm$^2$; in other versions of the invention, it can range from 10,000 to 100,000 fibers/cm$^2$.

Finally, the filtering module 3 further includes a device for compressing radially the filtering mass 26, consisting of an inflatable belt formed as a circular air chamber 29 surrounding said filtering mass and connected to the compressed air conduit 19. Preferably, the inflatable belt 29 does not surround the filtering mass on the totality of its height and the upper and lower annular spaces are occupied respectively by an upper and a lower ring 30 and 30', which further act to maintain axially the filtering mass 26 inside the cylindrical easing 27. In practice, the inflatable belt 29 and the two rings, respectively the upper one 30 and the lower one 30', can be produced as a single piece which is close fitted inside the cylindrical casing 27 and which thus forms a readily interchangeable cartridge.

The inflatable belt 29 is constructed so as to inflate and compress the filtering mass radially in the direction of its central axis (see the right-hand half of FIG. 2) when air is introduced therein via conduit 19. The filtering mass 26 and the inflatable belt resume their initial form (FIG. 2, left-hand side) when the introduction of air through the conduit 19 is stopped and water is passed again followed by air, axially through the filtering mass 26. The possibility of compressing radially the filtering mass 26 with this inflatable belt makes it possible to improve substantially the efficiency of the cleaning by countercurrent washing of said filtering mass 26.

For a module of 300 mm in diameter, the radial compression of the filtering mass 26 can be in the order of 40 mm at mid-height, from the initial diameter. Such a 300 mm diameter module having a height of 150 mm can filter water at the rate of approximately 300 l/min.

We shall now describe the general functioning of the apparatus described previously with reference to FIG. 1.

Firstly, in the normal operative position of the filter, the valves 9, 13, 16, 18 and 20 are closed and the liquid to be treated, for example water, is introduced via valve 7 (open) and flows upwards through the filtering module 3 to exit filtered via valve 11.

Each apparatus has a filtering capacity determined by the type of liquid to be filtered, and the through flow is controlled by a flow limiter 8, which also prevents a predetermined upstream pressure (i.e. in the lower cavity 5) from being exceeded. With a filtering module such as the one described above by way of example with reference to FIGS. 2 and 3, the normal working pressure is in the order of 5 bars (with a flow rate of approximately 300 liters/minute) and the pressure differential is set at +0.3 bar.

When the pressure in this upstream cavity 5 reaches the predetermined level relative to the initial pressure, for example 5.3 bar, the countercurrent rinsing must then be carried out. In practice, this pressure is monitored by the contact pressure controller 23, which initiates the rinsing phase. Preferably, the operations of the apparatus are automated and computer controlled, and the pressure controller 23 issues the order to carry out automatically the following operations for the purpose of cleaning and rinsing the filtering module:

(a) closing of the input valve 7 and the output valve 11, (b) opening of the drainage valve 9 for allowing the emptying of the liquid from the lower or upstream cavity 5, then (c) introduction of air inside the air chamber 29 by the opening of the valve 20 (the valve 18 being closed), to inflate this belt and thus compress radially the filtering mass 26 containing residual solid matter accumulated during the filtration phase, and then closing of this valve 20;

(d) introduction of air into the cavity 4 by the opening of the valve 18, to push downwards the water which drains away the residual solid matter agglomerated by the compression of the filtering mass 26 from this filtering mass and its evacuation via the drainage orifice 6 (the valve 9 being open);

(e) closing of the valve 18 and introduction of water into the upper cavity 4 by the opening of the valve 13, which is closed after a few seconds; then, the operations described in (c) through (d) are repeated;

(f) then, after a last drainage of the system by blowing air via the valve 18 which is opened for this purpose, the valves 18 and 9 are closed and the valves 7 and 16 are opened; then the outlet valve 11 is opened and finally the valve 16 is closed, which makes it possible to resume the filtering operations as described previously.

The complete cycle of cleaning-rinsing lasts approximately 1 minute, and it can of course be repeated several times in succession if required, and more particularly so the operations (c) to (e), and it can be carried out in a different order for the various operations. Finally, the filtering operation can be resumed as described previously, until a new cleaning-rinsing cycle is initiated by the predetermined pressure differential.

In another version (not illustrated) of the apparatus according to the invention, the latter can include several filtering modules such as the one described above, these filtering modules being disposed to run parallel to one another in a single cylindrical casing of a diameter substantially larger than that described with reference to the appended drawings. The apparatus would then further include an upper assembling plate and a lower assembling plate for holding together the filtering modules and ensuring the watertightness between the modules, so that the liquid to be filtered may only flow through the filtering masses of these modules.

Finally, one can further note that the inflatable belt 29 can also be used in a manner somewhat different from that described above, and more particularly for the purpose of modifying by compression the density of the constituent fibers of the filtering mass, in order to alter its filtration characteristics. In this case, one only needs to act upon the conduit for introducing air 19, to adjust the real density of the filtering mass 26. When this filtering mass is compressed for the filtering operation (right-hand side of FIG. 2), then the steps of the countercurrent cleaning process of the filter, as they were described previously, must be modified accordingly, the first of these steps being that of the "decompression" of the filtering mass 26.

I claim:

1. A filtering module for a liquid comprising a filtering mass formed by individual elongated fibers having each a diameter or transverse section of about 3 to 40 microns, said fibers being disposed axially so as to run substantially parallel to one another and maintained together by radial compression in a cylindrical casing, said filtering mass having a density of about 10,000 to 100,000 fibers/cm$^2$ and being surrounded by an inflatable belt arranged between said mass and said cylindrical casing and usable for modifying said density, and annular members disposed inside the cylindrical casing respectively above and below said inflatable belt, said inflatable belt being of a height lesser than that of the filtering mass, and said annular members adapted to form with said inflatable belt an interchangeable cartridge produced as a single part.

2. A filtering module according to claim 1, wherein the cylindrical casing is made from one of a synthetic material and metal.

3. In a liquid filtration apparatus including a filter body in which is housed at least one filtering module and which has respectively input and output orifices for liquid to be treated and for outflowing filtered liquid, the improvement wherein the filtering module comprises a filtering mass formed by individual elongated fibers having each a diameter or transverse section of about 3 to 40 microns, said fibers being disposed axially so as to run substantially parallel to one another and being maintained together by radial compression in a cylindrical casing, said filtering mass having a density of about 10,000 to 100,000 fibers/cm$^2$ and being surrounded by an inflatable belt arranged between said filtering mass and said cylindrical casing and usable for modifying said density, said filter body including means for introducing rinse water, means for introducing compressed air, means for draining and means for rinsing the apparatus, and said inflatable belt being fluidly connected to an air supply.

4. A filtration apparatus according to claim 3, further including several filtering modules housed and arranged so as to run parallel to one another in said filter body, said modules being held together respectively by an upper and by a lower assembling plate, which further ensure the watertightness of said modules.

5. In a liquid filtration apparatus including a filter body in which is housed at least one filtering module and which has respectively input and output orifices for liquid to be treated and for outflowing filtered liquid, the improvement wherein the filtering module comprises a filtering mass formed by individual elongated fibers having each a diameter or transverse section of about 3 to 40 microns, said fibers being disposed axially so as to run substantially parallel to one another and being maintained together by radial compression in a cylindrical casing, said filtering mass having a density of about 10,000 to 100,000 fibers/cm$^2$ and being surrounded by an inflatable belt arranged between said filtering mass and said cylindrical casing and usable for modifying said density, said filter body being divided vertically into three zones, a first zone situated in the lower part of the filter body including orifices for receiving liquid to be treated and for evacuating liquid, as well as means for controlling the internal pressure, a second zone situated in the upper part of the filter body and including outlet orifices for filtered liquid, as well as means for introducing compressed air and for introducing rinse water, and a third zone situated between the first and second zones, in which is housed the filtering module.

* * * * *